United States Patent [19]

Romagnolo

[11] 4,059,363

[45] Nov. 22, 1977

[54] CUTTING PLATES WITH ROUNDED CUTTING EDGES AND CONCAVE FRUSTOCONICAL CUTTING SURFACES

[75] Inventor: Gerard Romagnolo, Eybens, France

[73] Assignee: Ugine Carbone, Grenoble, France

[21] Appl. No.: 665,263

[22] Filed: Mar. 9, 1976

[30] Foreign Application Priority Data

Apr. 9, 1975 France .................................. 75.11727

[51] Int. Cl.$^2$ ............................................. B26D 1/00
[52] U.S. Cl. .................................................... 407/114
[58] Field of Search ................................. 29/95 R, 96

[56] References Cited

U.S. PATENT DOCUMENTS

| | | | |
|---|---|---|---|
| 1,838,520 | 12/1931 | Archer | 29/96 |
| 2,870,523 | 1/1959 | Richard | 29/96 |
| 3,137,917 | 6/1964 | Dowd | 29/95 R |
| 3,395,434 | 8/1968 | Wirfelt | 29/95 R |
| 3,399,442 | 9/1968 | Jones et al. | 29/95 R |
| 3,786,541 | 1/1974 | Lundgren | 29/95 R |

*Primary Examiner*—Leonidas Vlachos
*Attorney, Agent, or Firm*—Dennison, Dennison, Meserole & Pollack

[57] ABSTRACT

A new cutting plate with a chip-breaker on at least one of the working faces, the plate being triangular or quadrilateral, with a preferably zero or positive back clearance and with a cutting angle which may generally be of any size but preferably positive. The plate is characterized in that the back clearance angle $\delta$ and cutting angle $\eta$ are obtained from cutting surfaces which are portions of conical surfaces with axes perpendicular to the plane $Q_\gamma$ containing the main cutting points, that the cutting edge comprises at least one arc of a curve, representing the intersection between at least one cone and the plane $Q_\alpha$, and that the cutting surface adjoining a cutting point, comprising two consecutive surface elements joined along an arc of a curve in the plane bisecting the cutting point, causing discontinuity in the lines of level, is such that the cutting angle decreases as the plane $N_0$ approaches the cutting point.

16 Claims, 28 Drawing Figures

Vue suivant F

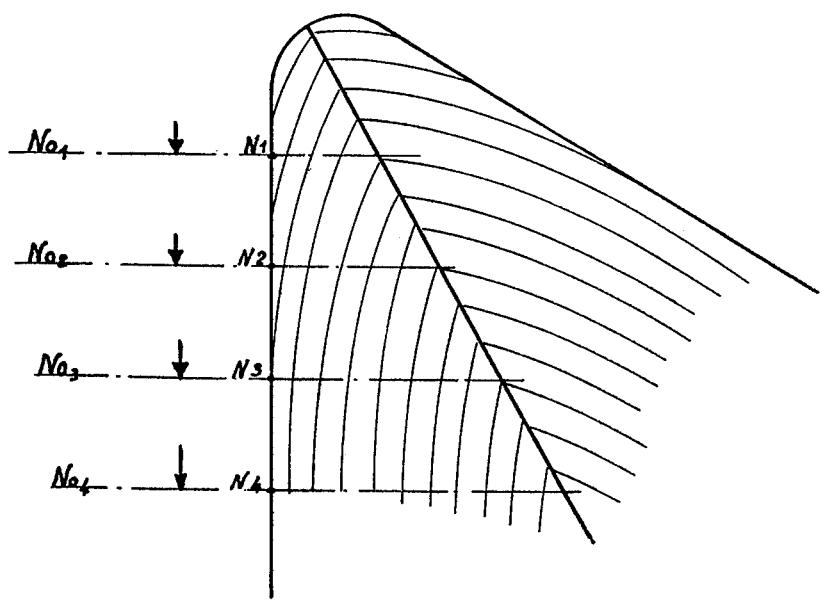
FIG. 27
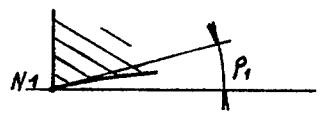
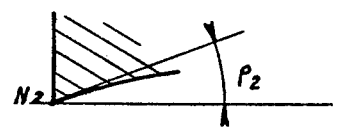
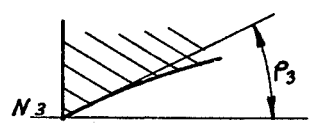
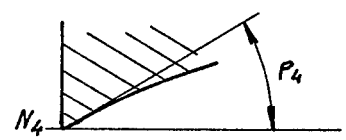

CUTTING PLATES WITH ROUNDED CUTTING EDGES AND CONCAVE FRUSTOCONICAL CUTTING SURFACES

The invention relates to a new cutting plate having a chip breaker on at least one of the working faces, the plate being triangular or quadrilateral in shape, with a preferably zero or positive back clearance, with a cutting angle which may generally be of any size but preferably positive, and with concave frusto-conical cutting surfaces. The plate is designed to be fitted onto the body of conventional tools for machining metals or metal articles.

The definitions which follow and which are necessary to aid description of the invention will be better understood if FIGS. 1, 2 and 3 of the accompanying drawings are referred to. In these:

$Q\gamma$ is the plane containing the cutting points such as A1, A2, A3, while $Q_\alpha$ is one of the planes containing two cutting points and defining the outline of the plate.

Figures 1, 2, 3:
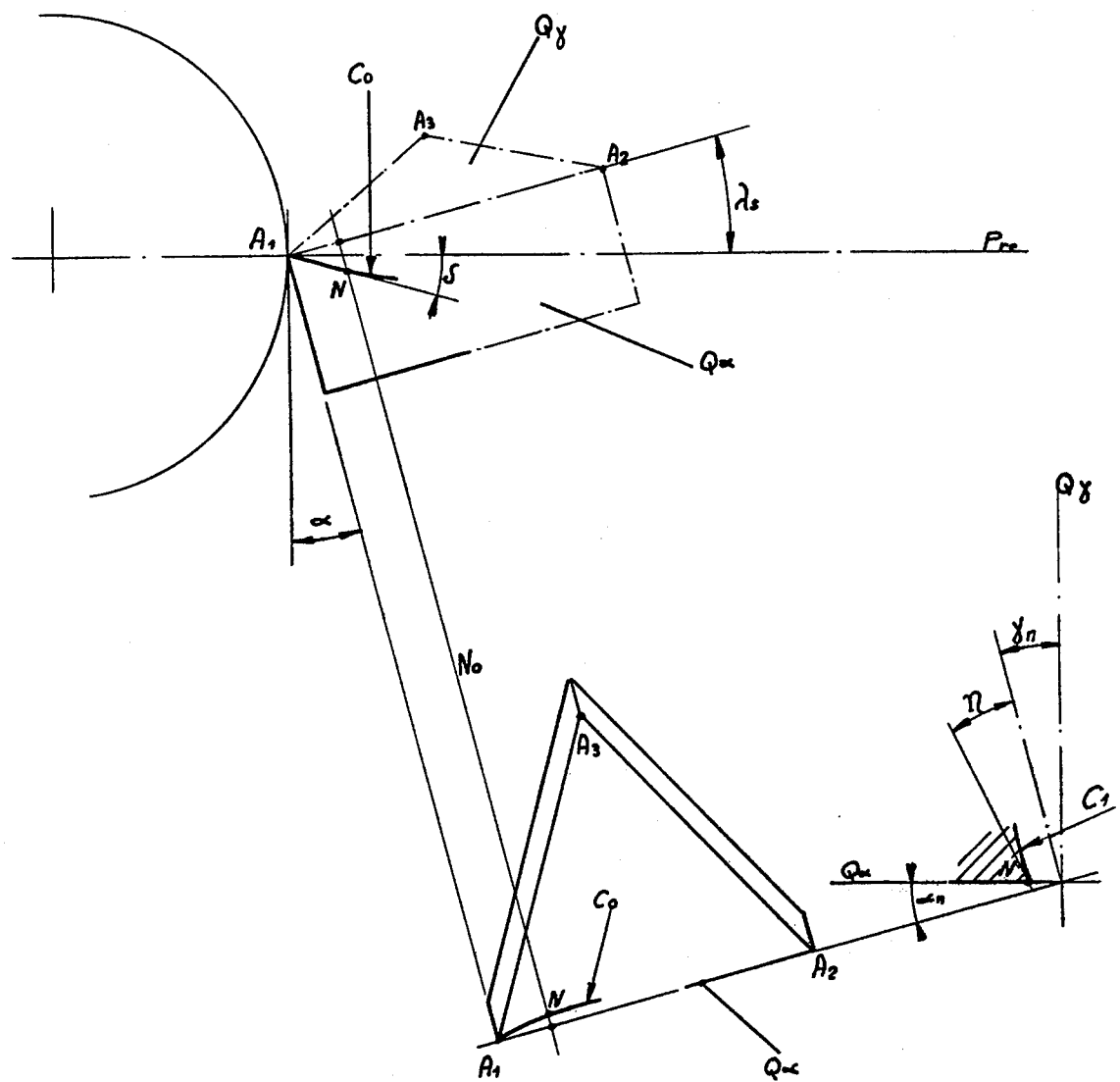
FIG. 1 is a front projection of a triangular cutting plate without a chip breaker of FIG. 2, the plate being located in space with the cutting point A1 at work and $\alpha$ being the rake angle at that location.
FIG. 2 is a view of the cutting plate from above, in a direction perpendicular to edge A1 A2 in FIG. 1.
FIG. 3 is a section through the cutting plate in the near vicinity of cutting point A1, through a plane $No$, perpendicular to edge A1 A2.

"Back clearance" (FIG. 1) should be understood as defining an angle $\lambda_s$ for a plate without a chip breaker, or an angle $\delta$ for a plate with rounded edges and with a chip breaker, such that the angle $\lambda_s$ has the angular inclination of edge A1 A2, and the reference plane at work (P$re$) passing through the axis of revolution of the article being machined and the cutting point A1 at work, while angle $\delta$ is the angular inclination, relative to the said reference plane at work, of the tangent at cutting edge $Co$ at point N, the intersection between $Co$ and the plane $No$.

"Cutting angle" (FIG. 3) is intended to define a particular angle in plane $No$ perpendicular to edge A1 A2 of the plate at a location close to cutting point A1, such as point N. For a plate without a chip breaker, the angle $\gamma n$ defined by the intersection of planes $Q\gamma$ and $No$ on the one hand and P$re$ and $No$ on the other hand. For a plate with a chip breaker, the angle $\eta$ defined by the intersection of planes $No$ and P$re$ on the one hand and the tangent at curve $C_1$ resulting from the intersection of the cutting face with plane $No$ at location N, the intersection between edge $Co$ and plane $No$.

For a long time experts have been making cutting tools of more and more elaborate geometry, the cutting surfaces and chip-breaking surfaces being designed to give the best possible action on the surface of the article to be machined, and the most suitable shape to the chip removed from the article, so that it can curl up and break into small pieces and can easily be eliminated from the working area.

For this reason cutting tools made in one piece with the cutting and chip-breaking faces formed by grinding were first advocated and used. With this cutting method, however, it was difficult to give the cutting and chip-breaking faces shapes which would be most suitable and most sophisticated both for ordinary and specialized machining work. Furthermore, the faces could not be reproduced faithfully when reground.

Finally, the fact that it was impossible to form some particularly complex cutting and chip-breaking faces with the grinding gear limited the field of application, particularly as far as the interval in cutting feed was concerned.

Because of these first disadvantages, experts proposed the use of detachable cutting plates, generally made by powder metallurgy such as calcining and designed to be mounted mechanically on the body of a tool for cutting. It then became possible to study the new forms of cutting and chip-breaking faces for a cutting plate and to guarantee good reproduction thereof.

Many types of cutting plates have been proposed in the art. Of these, a first type concerns a cutting plate where the geometry of the grooves was designed originally for manufacture by cutting on a grinding wheel. The plate which comprised a prismatic volume had at least one upper face, one cutting point and one chip-forming groove disposed on that face. The plate was distinguished by the fact that the groove comprised two concave coaxial conical faces obtained by juxtaposing two coaxial frusta of cones joined at their large end so that the axis was in a plane parallel to and above the upper face of the plate and thus located in the dihedron defined by the cutting point. Furthermore, one of the two conical faces defined the cutting face of the plate and the other the chip-breaking face.

Although this special geometry seemed to lead to optimum unwinding of the chip to enable it to flow away, it was apparent that since the geometry of the chip-breaking groove is of revolution, the two cutting and chip-breaking surfaces are continuous and for that reason have the serious disadvantage in the region of the grooved cutting point of not forcing the chip to wind up well due to the absence of any means for producing a change of trajectory.

Consequently, this type of plate cannot be used for cuts of small depth and it therefore loses its universal character.

To eliminate these drawbacks, other types of cutting plates have been advocated and also shaped so that the back clearance and cutting angles are simultaneously zero or positive. These plates differ from those previously described in the geometry of the cutting surfaces; this has to be obtained by a special method, for example, direct compression of powders.

The cutting surfaces are either elements of spheres or cylindrical elements. In the case of a sphere, its radius is established and its center disposed on a perpendicular drawn at the center of the corresponding face of the plate.

But when the cutting surface instead of being a continuous portion of a sphere is formed by a cylindrical surface, the axis is in a plane perpendicular to the cutting edge of the plate and is inclined towards its center of gravity. Thus, to form a plate with a plurality of cutting points, the cutting surfaces comprise cylinders equal in number to the cutting points and of the same size. Since the cutting surfaces have parallel generatrices, they encourage unwinding in a direction parallel with the cylinder generatrices, i.e., perpendicular to the cutting edge. Consequently, a serious disadvantage becomes apparent, chiefly for cutting plates with two cutting directions in cases where there is a small cutting depth: this is the fact that a preferred direction for the unwinding of the chip is imposed leading the chip outside the chip-breaking surfaces. It follows that the chip will escape the restraining surface of the chip-breaker and will thus be mis-shapen.

A different type of plate has been proposed in the art, triangular, square or hexagonal in shape, and its cutting surface is generated by the action of a grinding wheel, applied to the plate at a given angle in such a way that this main surface rises from the cutting edge towards the inside of the plate, and in such a way that the cutting angle of the edge is obtuse. Thus, the cutting surface and the corresponding edge between two cutting points are curved and convex so that when the plate comes into contact with the article to be machined, the initial point of contact is on the cutting edge at a location remote from the cutting points. The fact that the edge is curved reduces chattering and consequently wear. Despite the properties described, it should be noted that the plate has major disadvantages which constitute a serious obstacle to the universal use.

Thus, a rough prismatic or pyramidal shape for the plate is obtained by direct compression of powders and it is essential for the plate to be machined on a grinding wheel to obtain its definitive geometrical characteristics.

Furthermore, means described as advantages have been found in practice to be major defects which make such a tool difficult to use for machining where chip control is fundamental. Such is the case of the back clearance and of the cutting angle with a negative tendency which detract from the unrolling property of the chip.

All of the above disadvantages prompted applicant to carry out research in this field and to perfect a cutting plate with special surfaces which would provide a real solution to the difficulties encountered in the art.

A new cutting plate has now been found. It is generally triangular or quadrilateral in shape and has a chip-breaker on at least one of the working faces, a preferably zero or positive back clearance and a cutting angle which may generally be of any value, but preferably positive. The cutting plate is characterized in that:

a. The back clearance angle and cutting angle are obtained from cutting surfaces which are portions of conical surfaces with axes perpendicular to the plane $Q\gamma$ containing the main cutting points.

b. The cutting edge comprises at least one arc of a curve representing the intersection between at least one cone and the plane $Q\alpha$.

c. The cutting surface adjacent a cutting point, which comprises two consecutive surface elements connected in in arc of a curve in the plane bisecting the cutting point and causing discontinuity in the lines of level, is such that the cutting angle $\eta$ decreases as the plane $No$ approaches the cutting point.

Figures 4, 5:
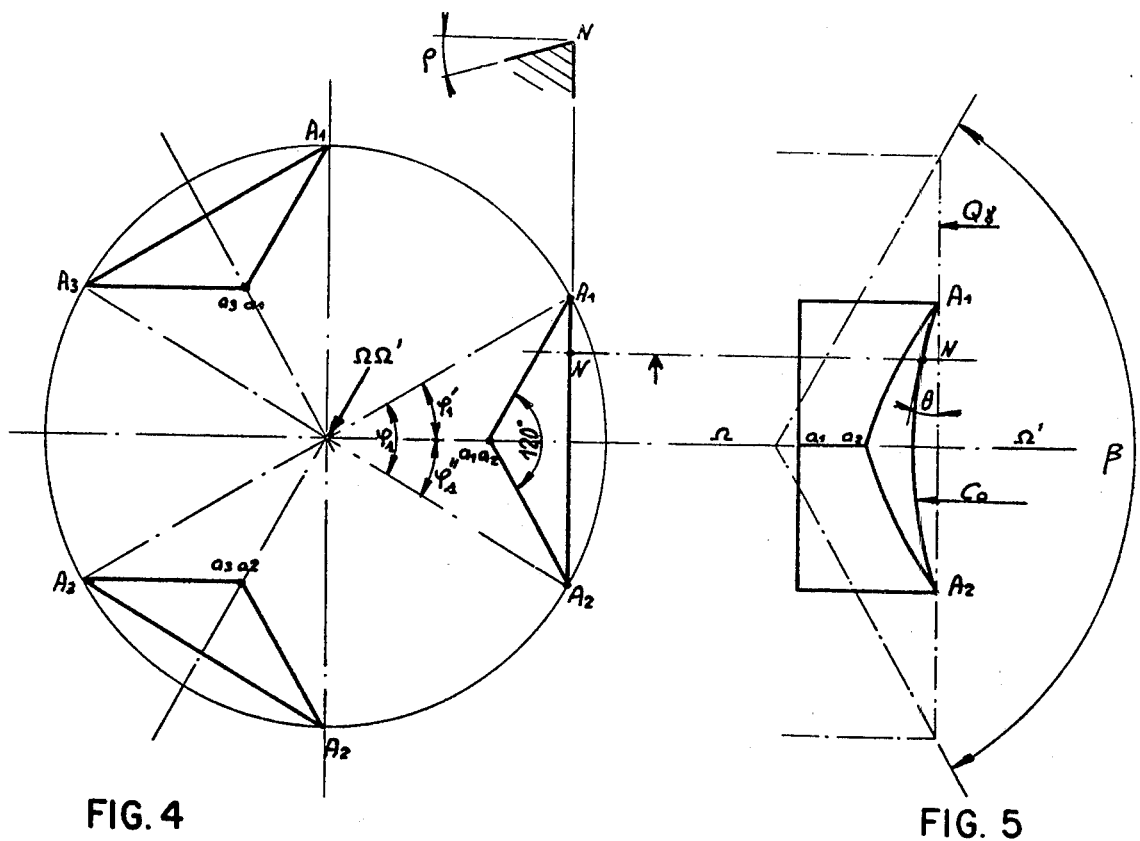
Figure 6:
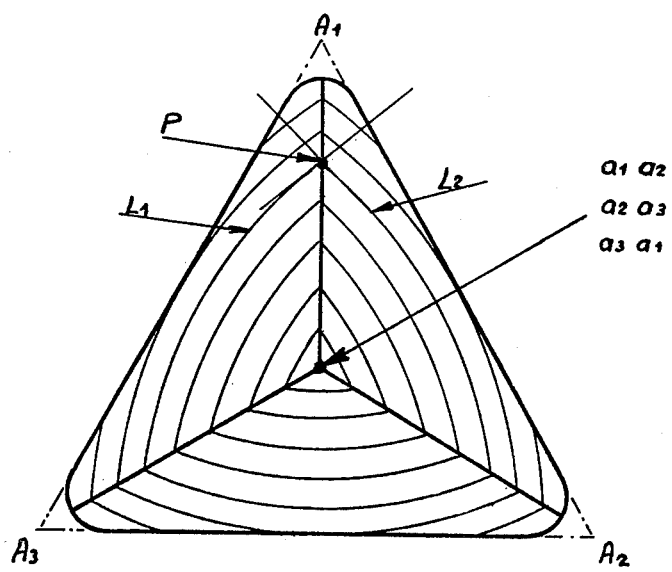

The description of the invention will be better understood from the various accompanying drawings not already described which in no way restrict the scope of the invention. In these:

FIGS. 4, 5 and 6 represent an embodiment of the cutting face of a triangular plate where the resultant cutting edge comprises a single continuous arc of a curve.

Figure 7:
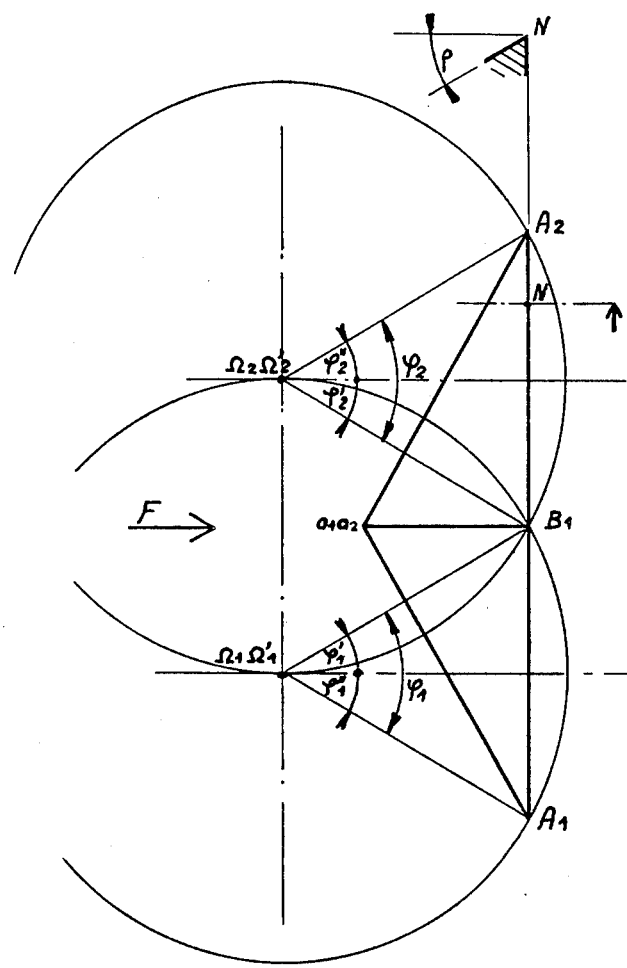
Figure 8:
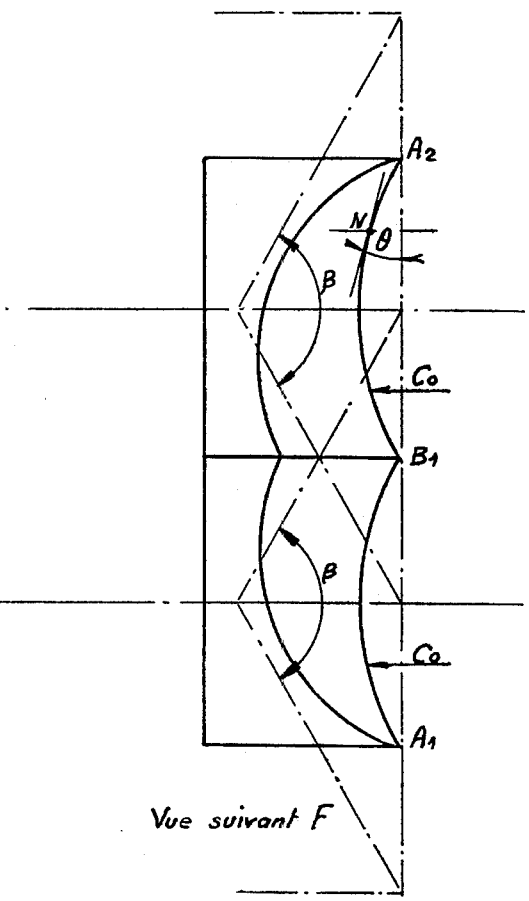
Figure 9:
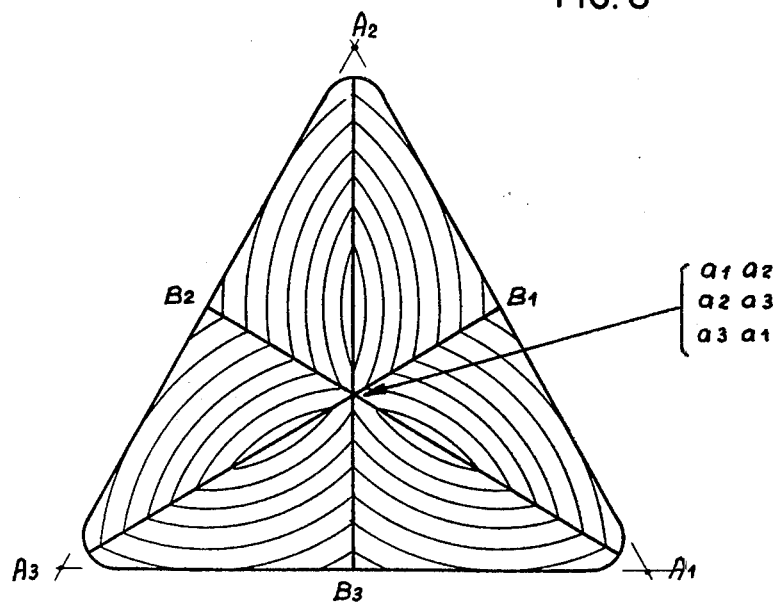
Figure 10:
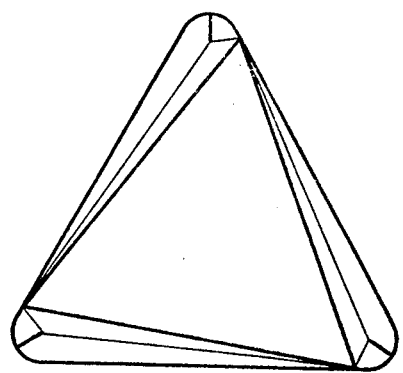
Figure 11:
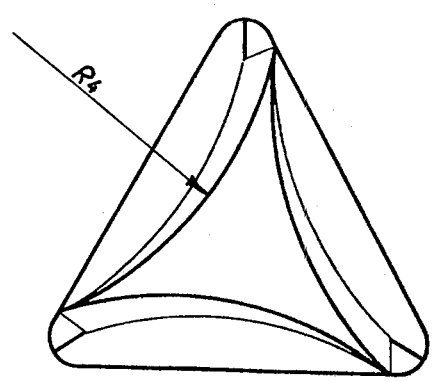
Figure 12:
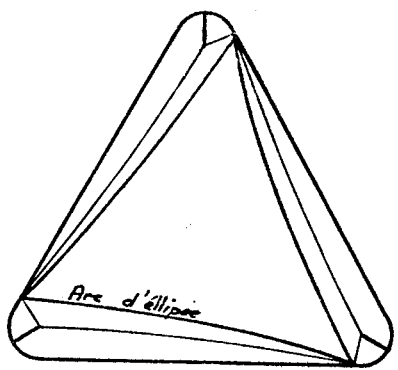
Figure 13:
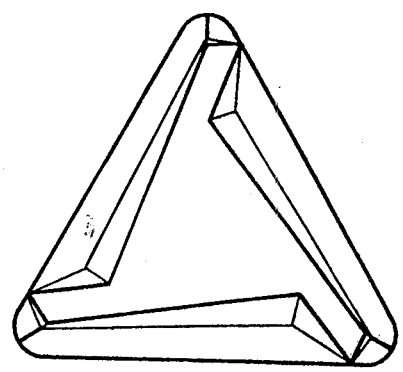
Figure 14:
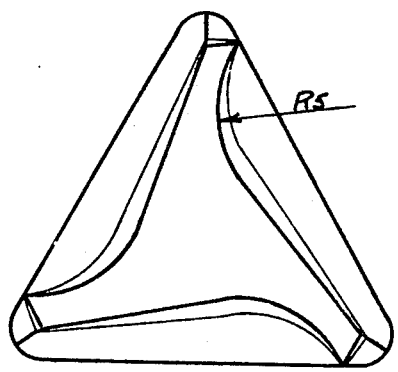
Figure 15:
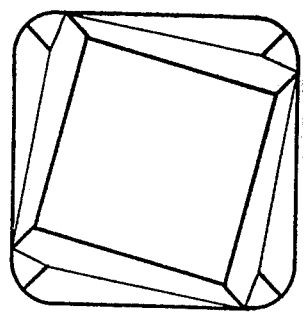
Figure 16:
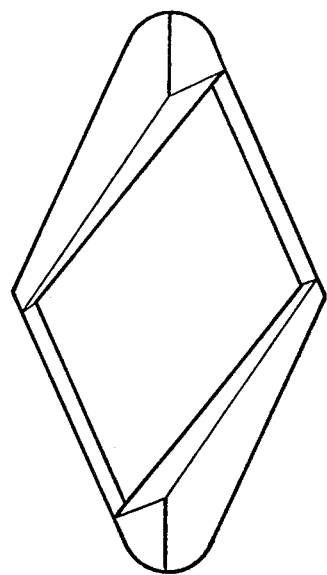
Figure 17:
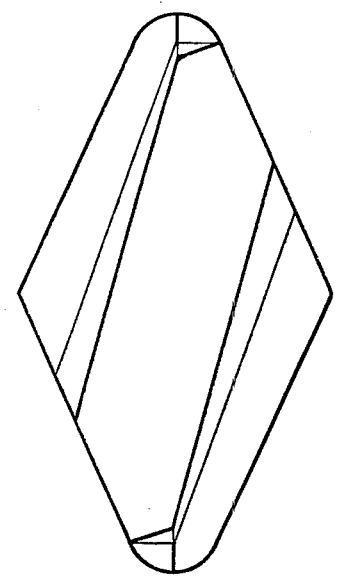

FIGS. 7, 8 and 9 relate to a different embodiment of the cutting surface of a triangular plate where the resultant cutting edge comprises two separate curve arcs.

FIGS. 10, 11, 12, 13, 14, 15, 16, and 17 represent cutting plates designed for a right-hand cut, where the chip-breaker surface may comprise the frustum of a pyramid, the intersection by a plane parallel to $Q\gamma$ defining a geometrical shape such as a triangle, square, rhombus or other more complex geometry made up of straight lines and/or curves, the axis of which coincides with that of the plate; there is angular dephasing with the polygon formed by the cutting edges. Such plates may be designed for a left-hand cut simply by making these figures symmetrical.

FIGS. 18, 19, 20, 21, 22, 23, 24 and 25 represent plates designed for a right-hand and left-hand cut, the chip-breaker surface forming geometrical figures, the axes of symmetry of which coincide with the bisectors of the cutting points.

The cutting surfaces, portions of conical surfaces with axes perpendicular to the plane $Q\gamma$ containing the main cutting points, may be defined simply from a cutting edge, such as edge A1 A2 (FIG. 4 or 7), the intersection between plane $Q\alpha$ and a succession of cones of revolution with their axes perpendicular to plane $Q\gamma$. These intersections define a succession of rounded cutting edges such as $Co$, the arcs and chords of which may be equal or different in size, each of the arcs belonging to a separate cone.

Thus, in the special case of a triangular cutting plate where the cutting surfaces comprise three separate elements belonging to one and the same cone with an apex angle $\beta$ and an axis $\Omega\Omega'$ (FIGS. 4, 5 and 6), the resultant cutting edges form continuous curve arcs, the chords of which are respectively A1 A2, A1 A3 and A2 A3. These three surfaces are joined in the planes bisecting the cutting points, the location common to the three surfaces when joined being defined by $a1\ a2$, $a1\ a3$, $a2\ a3$.

In the most frequent case where the plate has the shape of an equilateral triangle, chords A1 A2, A1 A3, A2 A3 are seen from $a1\ a2$, $a1\ a3$ and $a2\ a3$ at an angle of 120°.

These same chords A1 A2, A1 A3 and A2 A3 are seen from $\Omega\Omega'$ (FIG. 4) at an angle $\psi 1 = \psi' 1 + \psi'' 1$.

When points A1, A2 and A3 are at the same height, as is generally the case, angles $\psi' 1$ and $\psi'' 1$ are equal and the plane such as that defined by $\Omega\Omega'$ and $a1\ a2$ is the bisector of angle $\psi 1$.

Angles $\theta$ and $\rho$, which are respectively clearance and cutting angles, measured relative to reference plane $Q\gamma$, are expressed by the following equations:

$$\theta = \delta + \lambda s$$

$$\rho = \eta + \gamma n$$

The two angles which determine the curvature of an edge, such as $Co$, and the cutting angle in the vicinity of the cutting point defining that edge, may vary according to the characteristics required for the cutting plate, purely according to the values given to $\psi' 1$, $\psi'' 1$ and $\beta$.

It follows that there are many possible combinations of the two angles.

For a precise value of $\beta$ and points A1 and A2 in plane $Q\gamma$, it is possible to vary angle $\psi 1$ and consequently the value of the ratio $\rho/\beta$, $\psi 1$ being equal to 2 $\psi' 1$ or 2 $\psi'' 1$.

Thus, if $\psi 1 = 90°$, $\rho/\theta = 1/1$
if $\psi 1 > 90°$, $\rho/\theta < 1/1$
if $\psi 1 < 90°$, $\rho/\theta > 1/1$ Similarly, for a given value of $\psi 1$, i.e. for a specific $\rho/\theta$ value, the absolute value of these angles follows automatically from the choice of $\beta$.

Finally, in the case of FIG. 6 where angle $\psi 1$ is less than 120°, the tangents at two lines of the same level at a point P for example, along the curve A1, ($a1\ a2$) connecting two cutting surfaces containing the said lines L1 and L2, do not coincide and demonstrate the presence of a dihedron, providing the discontinuity required in the cutting surfaces.

In another special case, represented by FIGS. 7, 8 and 9, and relating to a triangular cutting plate, the cutting surfaces comprise six separate cutting surface elements belonging to six cones, also separate with the same angle at the apex $\beta$ and the same height relative to $Q\gamma$.

If one considers an isolated cutting surface element, a resultant cutting edge such as A1 B1 is seen from the axis of cone $\Omega\ 1\ \Omega'\ 1$ at an angle $\psi\ 1 = \psi'\ 1 + \psi''\ 1$.

If two symmetrical elements are joined, this creates an edge A1 A2, comprising two curve arcs A1 B1 and B1 A2 (FIG. 8).

When points such as A1, A2 and B1 are at the same height, angles $\psi\ 1$ and $\psi\ 2$ are equal. The same applies to angles $\psi'\ 1$ and $\psi''\ 1$, and $\psi'\ 2$ and $\psi''\ 2$.

When points such as B1 are at a height below that of A1 and A2, $\psi'\ 1$ will be smaller than $\psi''\ 1$ and $\psi'\ 2$ smaller than $\psi''\ 2$, whereas when B1 is at a height above that of A1 and A2, $\psi'\ 1$ will be larger than $\psi''\ 1$ and $\psi'\ 2$ similarly larger than $\psi''\ 2$.

When it is necessary for A1 and A2 to be at the same height, it becomes necessary to have $\psi'\ 1 = \psi'\ 2$ and $\psi''\ 1 = \psi''\ 2$.

The surface of a cutting plate shaped as an equilateral triangle is formed by assembling three elements of the type A1 A2 ($a1\ a2$).

When B1 is at a different height from A1 and A2, angles $\psi\ 1$ and $\psi\ 2$ will be identical but $\psi'\ 1$ will be different from $\psi''\ 1$ and $\psi'\ 2$ different from $\psi''\ 2$.

Thus, as already mentioned, choice of angles $\psi\ 1 = \psi\ 2$ and $\beta$ leads to a knowledge of the ratio $\rho/\theta$ and the exact value of these two angles. The great advantage of arranging the cutting surfaces in this way is that very stable, reversible cutting plates can be produced.

More generally, the cutting surface adjoining a cutting edge of a plate according to the invention may be made up of $n$ conical component surfaces belonging to $n$ cones with an identical or different apex angle, generating a cutting edge comprising $n$ curve arcs of the type Co, with connecting points of the type B1 in plane $Q\gamma$ or at a level below $Q\gamma$, although they may equally be located at a level above $Q\gamma$. When the connecting points of the type B1 are in plane $Q\gamma$, the angles $\psi'\ 1 = \psi''\ 1$ and $\psi'\ n = \psi''\ n$.

But when the connecting points of the type B1 are located at a level below plane $Q\gamma$, angles such as $\psi'\ 1$ and $\psi'\ n$ are smaller than angles $\psi''\ 1$ and $\psi''\ n$.

When the connecting points of the type B1 are located at a level above plane $Q\gamma$, angles such as $\psi'\ 1$ and $\psi'\ n$ are larger than angles $\psi''\ 1$ and $\psi''\ n$.

If $n = 1$, the curve arc will be continuous between A1 and A2, whereas if $n = 2$ (FIGS. 7, 8 and 9), there will be only one connecting point which may be in plane $Q\gamma$ or above or below it.

If $n = 3$, there will be two connecting points located either in plane $Q\gamma$ or above or below that plane.

In this case, the angular values are respectively as follows:

in $Q\gamma$:
$\psi'\ 1 = \psi''\ 1$
$\psi'\ 2 = \psi''\ 2$
$\psi'\ 3 = \psi''\ 3$ above $Q\gamma$:
$\psi'\ 1 > \psi''\ 1$
$\psi'\ 2 = \psi''\ 2$
$\psi'\ 3 > \psi''\ 3$ below $Q\gamma$:
$\psi'\ 1 < \psi''\ 1$
$\psi'\ 2 = \psi''\ 2$
$\psi'\ 3 < \psi''\ 3$ According to the value taken on by $n$, greater than 3, the above relationships apply in the case of the extreme points, but more complex combinations may be chosen for the intermediate points.

Figure 26:
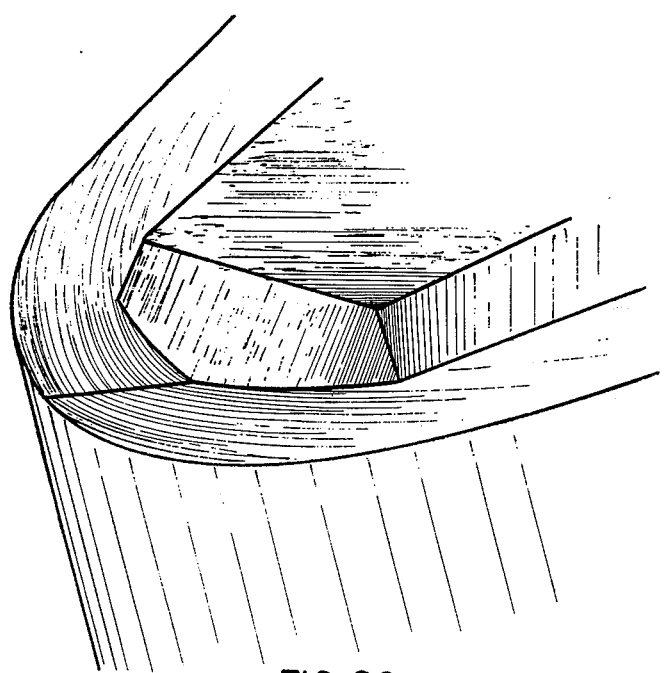

Finally, as shown in FIGS. 26 and 27, in which:

FIG. 26 shows in perspective the change in the direction of the cutting surfaces in the region of the plane bisecting one of the cutting points, and FIG. 27 expresses by angle $\rho = \eta + \gamma n$ the variation in the cutting angle along the profile, as a function of the displacement of plane $N_o$ ($N_{o1}$, $N_{o2}$, ... $N_{ok}$), the result is that the chip element flowing along the cutting surface is forced firstly to twist then, when it has reached the bisecting plane, undergoes a change of direction due to the variation in the slope of the cutting surface, which is symmetrical relative to the said plane.

The combination of these two effects forces the chip to move towards the chip-breaking surface and thus to curl up, far from the cutting area, then to break according to the optimum effect required in the invention.

Some of the more representative chip-breaking surfaces, mostly of a known type, are illustrated in FIGS. 10 to 25; these impose no restrictions on the invention. These surfaces belong to volumes comprising the group of pyramids, coaxially combined pyramids, conical adjusted surfaces having as their base arcs of circles, arcs of ellipses, arcs of parabolas, arcs of hyperbolas, more complex curves and combinations thereof, and volumes obtained from bases which combine arcs of curves and straight lines.

Figure 18:
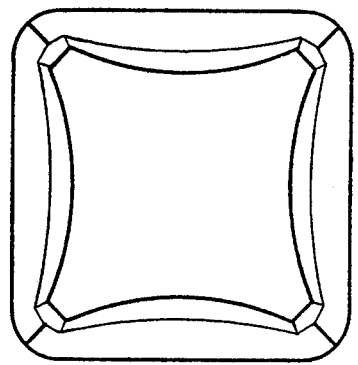
Figure 19:
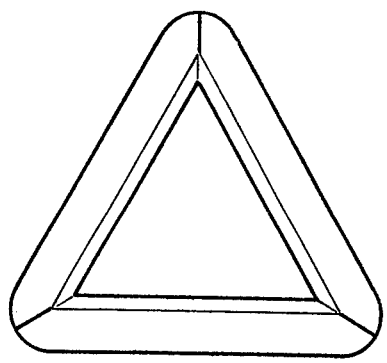
Figure 20:
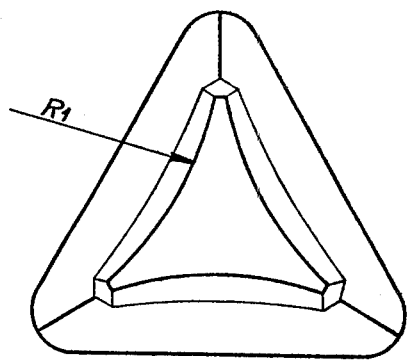
Figure 21:
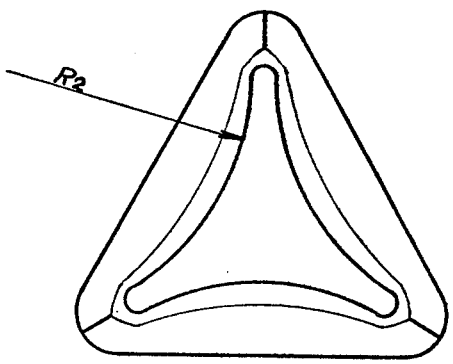
Figure 22:
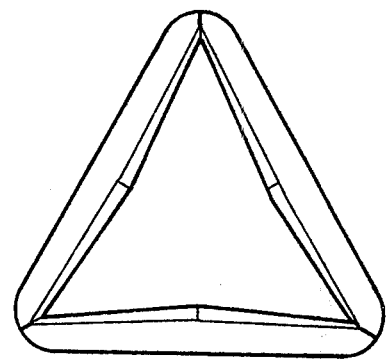
Figure 23:
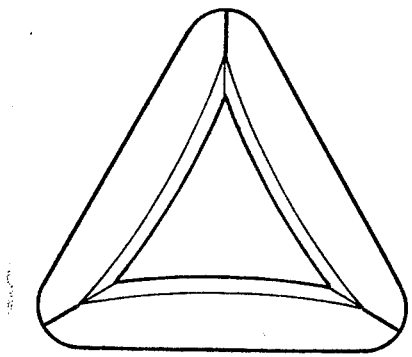
Figure 25:
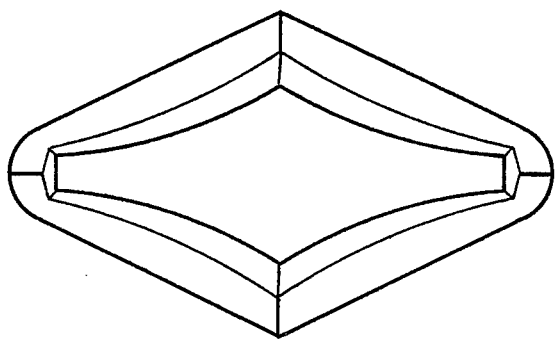

In a particularly interesting modification, illustrated in FIGS. 18, 20 and 25, and with a detail shown in FIG. 26, the cutting plate has a cutting point and a groove resulting from the description according to the invention, such that a hollow zone forms in the said cutting point with the lowest point in the hollow zone located in the plane which bisects the cutting point.

Thus, in this modification, the geometrical configuration, created by combining the cutting and chip-breaking surfaces, allows for the formation and fragmentation of chips under optimum conditions, particularly in cases where there is a small depth of cut. It is these particular properties which distinguish the plate according to the invention from prior art by increasing its field of application, that is to say, by enabling it to be used virtually universally.

As for the central part of the plate, defined by the chip-breaking grooves, this may comprise at least one plane, pyramidal, spherical, elliptical or any other similar surface, at least one cylindrical surface with its axis parallel or oblique relative to plane $Q\gamma$, or at least one conical surface with its axis parallel, perpendicular or oblique relative to $Q\gamma$.

Figure 24:
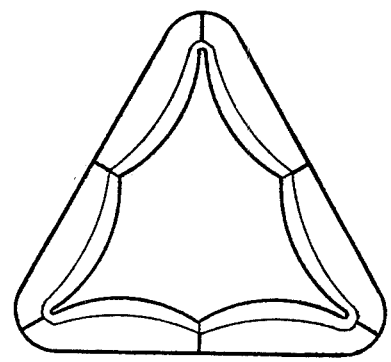
Figure 28:
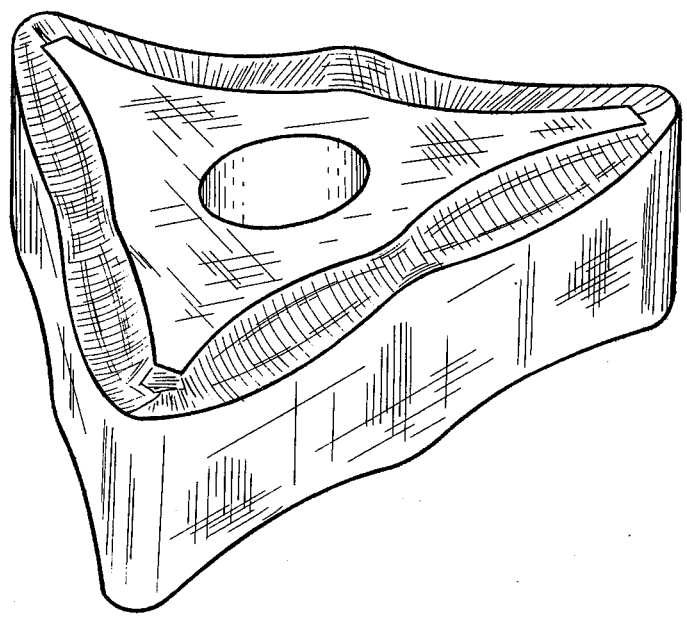

In the special case of a reversible plate, such as that shown in FIGS. 24 and 28, the central part which acts as a support for fixing onto the plate-carrying holder, is formed by a plane parallel with and slightly above plane $Q\gamma$.

Consequently, the novel combination of all the features thus described enables reversible cutting plates to be produced with a virtually universal field of application.

I claim:

1. A cutting plate of polygonal cross-sectional shape and including a chip-breaker on at least one of its working faces, said plate having an upper surface, a lower surface and a plurality of side surfaces defining said polygonal shape, at least one cutting point on a cutting point plane generally parallel to and below said upper surface, at least two cutting surfaces each defined by at least one conical surface with an axis perpendicular to said cutting point plane, said cutting point including a cutting edge at said cutting plane and comprising a surface generated by an arc of a curve adjacent an intersection between two of said side surfaces, two of said cutting surfaces in the region of said cutting point being joined along an arc of a curve bisecting said cutting point in a plane perpendicular to said cutting point plane wherein a discontinuity is provided by the angle of said two cutting surfaces decreasing as each of said conical cutting surfaces approaches said arc of a curve bisecting said cutting point, and the juncture of said side surfaces and said cutting surfaces comprising a cutting edge defined by a plane $Q_\alpha$ connecting two cutting points, which plane $Q_\alpha$ defines a portion of said polygonal shape.

2. A plate according to claim 1 wherein the cutting edge comprises a single arc of a curve, such that $\psi' 1 = \psi'' 1$.

3. A plate according to claim 2 wherein the ratio of the clearance and cutting angles $(\rho/\theta) \simeq 1/1$ when $\psi' 1 = \psi'' 1 = 45°$.

4. A plate according to claim 3 wherein angles $\rho$ and $\theta$ are determined by the angle at the apex $\beta$ of the cones.

5. A plate according to claim 2 wherein the ratio of the clearance and cutting angles $(\rho/\theta) < 1/1$ when $\psi' 1 = \psi'' 1 = 45°$.

6. A plate according to claim 2 wherein the ratio of the clearance and cutting angles $(\rho/\theta) > 1/1$ when $\psi' 1 = \psi'' 1 < 45°$.

7. A plate according to claim 1 wherein the cutting edge comprises two curve arcs, generated by two cones with the same angle at the apex $\beta$, and such that $\psi' 1 = \psi'' 1$ and $\psi' 2 = \psi'' 2$.

8. A plate according to claim 7 wherein the ratio of the clearance and cutting angles $(\rho/\theta) \simeq 1/1$ when $\psi'' 1 = \psi'' 2 = 45°$.

9. A plate according to claim 7 wherein the ratio of the clearance and cutting angles $(\rho/\theta) < 1/1$ when $\psi'' 1 = \psi'' 2 > 45°$.

10. A plate according to claim 7 wherein the ratio of the clearance and cutting angles $(\rho/\theta) > 1/1$ when $\psi'' 1 = \psi'' 2 < 45°$.

11. A plate according to claim 1 wherein the cutting edge comprises two curve arcs generated by two cones with the same angle at the apex $\beta$, and such that $\psi' 1$ is greater than $\psi'' 1$ and $\psi' 2$ is greater than $\psi'' 2$.

12. A plate according to claim 1 wherein the cutting edge comprises two curve arcs, generated by two cones with the same angle at the apex $\beta$, and such that $\psi' 1$ is less than $\psi'' 1$ and $\psi' 2$ is less than $\psi'' 2$.

13. A plate according to claim 1 wherein the cutting edge comprises $n$ curve arcs generated by $n$ cones.

14. A plate according to claim 13 wherein the points connecting the curve arcs of the type $Co$ are located in the plane $Q\gamma$ and such that $\psi' 1 = \psi'' 1, \psi' 2 = \psi'' 2 \ldots$ and $\psi' n = \psi'' n$.

15. A plate according to claim 13 wherein the intermediate connecting points of the type B1 located between the two cutting points are placed above the plane $Q\gamma$ and such that $\psi' 1$ and $\psi' n$ are less than $\psi'' 1$ and $\psi'' n$.

16. A plate according to claim 1 wherein a hollow zone is formed in the cutting point, the lowest point in the hollow zone being located in the plane which bisects the cutting point.

* * * * *